(12) United States Patent
Simpson

(10) Patent No.: US 7,660,472 B2
(45) Date of Patent: Feb. 9, 2010

(54) SYSTEM AND METHOD FOR MANAGING STEREOSCOPIC VIEWING

(75) Inventor: Todd Simpson, Calgary (CA)

(73) Assignee: Headplay (Barbados) Inc., Bridgetown (BB)

( * ) Notice: Subject to any disclaimer, the term of this patent is extended or adjusted under 35 U.S.C. 154(b) by 589 days.

(21) Appl. No.: 11/049,361

(22) Filed: Feb. 2, 2005

(65) Prior Publication Data

US 2005/0271303 A1    Dec. 8, 2005

Related U.S. Application Data

(60) Provisional application No. 60/542,975, filed on Feb. 10, 2004.

(51) Int. Cl.
*G06K 9/36* (2006.01)
(52) U.S. Cl. ............... 382/232; 380/252; 348/460
(58) Field of Classification Search ........... 382/100, 382/154, 232; 713/176; 380/210, 252, 287, 380/54
See application file for complete search history.

(56) References Cited

U.S. PATENT DOCUMENTS

| | | | | |
|---|---|---|---|---|
| 5,237,647 A | * | 8/1993 | Roberts et al. | 345/419 |
| 5,257,345 A | * | 10/1993 | Malm | 345/419 |
| 5,511,153 A | | 4/1996 | Azarbayejani et al. | |
| 5,675,377 A | | 10/1997 | Gibas | |
| 5,699,108 A | * | 12/1997 | Katayama et al. | 348/47 |
| 5,751,927 A | * | 5/1998 | Wason | 345/419 |
| 6,351,572 B1 | | 2/2002 | Dufour | |
| 6,477,267 B1 | * | 11/2002 | Richards | 382/154 |
| 2003/0071813 A1 | | 4/2003 | Chiabrera et al. | |
| 2003/0095177 A1 | * | 5/2003 | Yun et al. | 348/42 |
| 2004/0027267 A1 | * | 2/2004 | Rousso | 342/1 |
| 2004/0070673 A1 | * | 4/2004 | Nakamura | 348/207.2 |
| 2004/0101043 A1 | * | 5/2004 | Flack et al. | 375/240.01 |

OTHER PUBLICATIONS

International Search Report & Written Opinion issued for PCT/US05/04772 dated Feb. 16, 2007.
Search Report and Written Opinion issued for Singaporean Application No. 200604948-0; Dated: Dec. 23, 2008; 7 Pages.

* cited by examiner

*Primary Examiner*—Anand Bhatnagar
(74) *Attorney, Agent, or Firm*—Fulbright & Jaworski L.L.P.

(57) ABSTRACT

Methods and systems that help control when and how stereoscopic content should be viewed, based on both geometry of the viewing system and the geometry used to generate the content are shown. One example embodiment utilizes the specifications of the system used to capture the image data to determine the geometry of the image content, and encodes this content geometry along with the stored image data. This content geometry data is then analyzed by display systems to determine appropriate geometries for a viewing system. Data arranged according to one embodiment is a series of digitally stored video frames representing a stereoscopic prospective view of an image or scene. This prospective view was rendered using a specific content geometry, and this geometry is digitally encoded and stored with, or embedded in, the digital image data.

9 Claims, 2 Drawing Sheets

SYSTEM AND METHOD FOR MANAGING STEREOSCOPIC VIEWING

CROSS-REFERENCE TO RELATED APPLICATIONS

The present application claims priority to Provisional Patent Application Ser. No. 60/542,975 filed Feb. 10, 2004 entitled "SYSTEM AND METHOD FOR MANAGING STEREOSCOPIC VIEWING." The disclosure of which is hereby incorporated by reference. The present application is related to currently pending and commonly assigned application Ser. No. 10/715,911 filed Nov. 18, 2003 entitled "OPTICAL ARRANGEMENTS FOR HEAD MOUNTED DISPLAYS;" application Ser. No. 10/716,192 filed Nov. 18, 2003 entitled "MULTIPLE IMAGING ARRANGEMENTS FOR HEAD MOUNTED DISPLAYS;" and application Ser. No. 10/946,955 filed Sep. 22, 2004 entitled "SYSTEM AND METHOD FOR PROCESSING VIDEO IMAGES." The disclosures of which are hereby incorporated by reference.

TECHNICAL FIELD

The present invention is directed to the storing, managing, and displaying of stereoscopic image content, and more particularly to combining image data with the information describing the geometry used to create it.

BACKGROUND OF THE INVENTION

Image content displayed using two-dimensional mechanisms (such as a screen) can be given a third dimension by using stereoscopic (using separate left and right images) methods to reproduce human binocular vision. When humans view their surroundings, the spacing between the eyes provides a slightly different view of a given scene. The disparity between what one's left eye sees and what one's right eye sees is a cue for the brains to use in judging the relative distance of objects. The brain merges the different images through stereoscopic fusion to produce the three dimensional prospective we perceive.

Most stereoscopic viewing mechanisms can only approximate the stereoscopic fusion accomplished by human eyes viewing the real world. In the real world, eyes will both focus (accommodate) and converge (orient towards) to an object of interest, and it is this combination that cues the brain to perceive depth. In most viewing systems, however, the focal length (distance to the screen) remains static and only the convergence of the eyes is varied to provide the perception that an object is in-front of, or behind the screen. This difference can cause the stereoscopic fusion desired by the viewing system to break down—our brains are trained by real world viewing that accommodation and convergence are linked; when they differ by too much the left and right images will not fuse into a single object, and a double image will be seen at the screen.

Stereoscopic fusion can also break down if the field of view is less than typical human vision systems. The eyes provide a field of view of over 180 degrees, including peripheral vision, giving a very wide field of view. Edges of objects are very important clues for merging left and right image—in a narrow field of view, for example, a TV, an object can not be brought very far into stereoscopic space before some of the edges of the object will disappear in at least one eye. When this happens, the eyes interpret the edge of the screen as part of the image, and stereo fusion again breaks down.

In addition, the nature of the specific viewing system for stereoscopic data is often either not known, or is known to be varying. For example, movie content can, and will, be shown to users on a variety of different screen sizes. In more modern applications such as head-mounted-displays (HMDs), the focal distances and other geometric factors vary significantly between device types. Thus, the content must be gathered and rendered in a manner viewable on different display systems having very different geometries. The compromises made in accommodating varying geometries, however, often lead to eyestrain and discomfort and result in dramatic reductions in the stereoscopic effect.

BRIEF SUMMARY OF THE INVENTION

The present invention is directed to methods and systems that help control when and how stereoscopic content should be viewed, based on both geometry of the viewing system and the geometry used to generate the content. One example embodiment utilizes the specifications of the system used to capture the image data to determine the geometry of the image content, and encodes this content geometry along with the stored image data. This content geometry data is then analyzed by display systems to determine appropriate geometries for a viewing system.

Data arranged according to one embodiment of the present invention is a series of digitally stored video frames representing a stereoscopic prospective view of an image or scene. This prospective view was rendered using a specific content geometry, and this geometry is digitally encoded and stored with, or embedded in, the digital image data.

An example display system arranged according to one embodiment of the present invention is capable of reading digital video files, and reading the content geometry associated with the prospective of each frame. This example display mechanism is further capable of altering its own viewing geometry in order to accommodate a plurality of different content geometries.

Alternative example systems can be used with image data containing un-rendered three-dimensional information. Such a system can render a stereoscopic prospective view of the three-dimensional image information using a content geometry that is appropriate for the known viewing geometry of the viewing mechanism.

Another example display system is one that knows its own geometry, and reads the geometry encoded in the video stream to decide on what to display. In cases where the encoded content geometry would be inappropriate for stereoscopic display given the display system's viewing geometry, the system would instead display the content without the stereoscopic effect.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Stereoscopy is a method used to recreate a sense of depth for viewer viewing images using a two-dimensional display mechanism, such as video screens. When viewing an object, a viewer will perceive depth through both monoscopic (such as focal range or accommodation, size, perspective, occlusion, shading, luminance) and binocular cues (vergence and disparity). Vergence is a measure of how much the eyes converge or diverge when focusing on that object. Disparity is the relative difference in the image of that object between the left and right fields of view, as the image appears on the retina. Most displayed images are capable of recreating the monoscopic visual cues. In order to recreate the binocular cues, stereoscopic methods show different images to the right and left eye. Parallax is a measure of the horizontal distance (within the plane of the two-dimensional display screen or screens) between the points of focus (the object being viewed with depth) viewed by the right and left eye; parallax is directly correlated to disparity.

Figure 1:
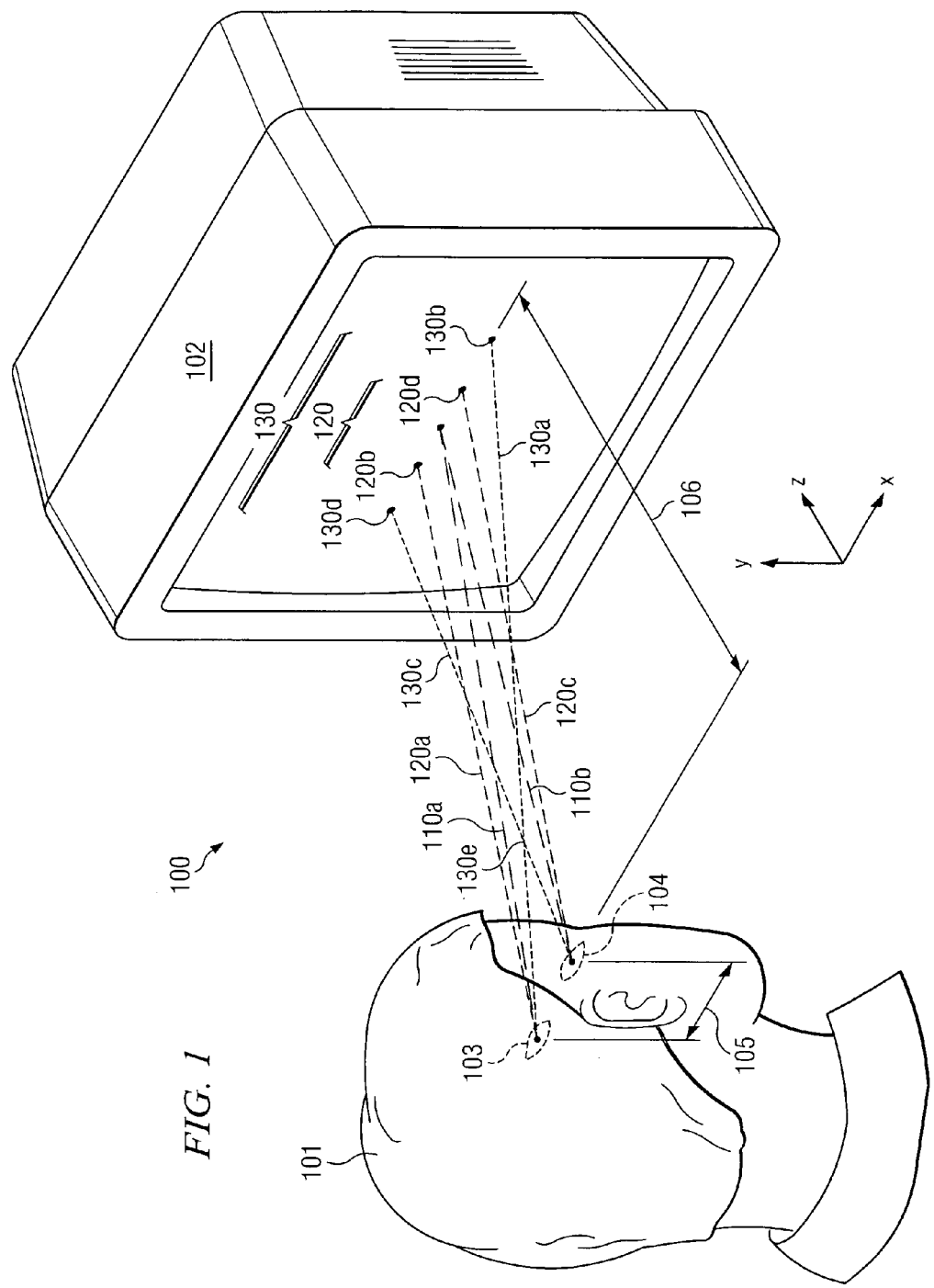
FIG. 1 illustrates the geometries utilized in one embodiment of the present invention.

FIG. 1 illustrates the geometry of viewing a stereoscopic images in accordance with one embodiment of the present invention. In FIG. 1, viewer 101 is viewing images displayed on a computer monitor screen 102. Normal image display, would display a single two-dimensional image on monitor 102 leaving all perception of depth (distance from the viewer along the Z-axis) to monoscopic cues. Using stereoscopic techniques, however, viewer 101 can be given binocular cues that give the perception of depth if different images are shown to each eye. Traditional methods in display systems such as system 100 would accomplish this through glasses (not shown) that selectively pass images, or other like means. Typical examples would be polarized filters, with different polarizations for each eye, or shutter glasses which alternatively open and close based on whether the image on the screen is intended for the left or the right eye. Head mounted displays (HMDs) are often used for stereoscopic viewing as well. Some HMDs utilize a single screen and then use polarization, shutters, or differing light paths to direct different images to each eye. Other HM15s contain independent displays for the left and right eye, and thus only rely on decoding the appropriate content for each screen, and not on a switching methodology. Other stereoscopic viewing mechanisms include auto-stereoscopic systems which do not require the user to wear any type of eyewear, but instead rely on projecting different images to each eye using lenticular lenses or other like methods. The embodiments of the present invention are not limited to any particular method of displaying different images to each eye, but, rather, can be adapted for use with any appropriate method. Additional example display mechanisms and methods can be found in the above identified co-pending and commonly assigned applications, the content of which are incorporated by reference.

FIG. 1 illustrates three separate depths of an object as perceived by viewer 101. Objects with a zero depth are intended to be perceived by viewer 101 to be in the x-y plane of monitor 102. Stereoscopic methods provide binocular cues for this depth by having the image intended for the left coincide with the image for the right eye, making the distance between the points of focus for the object zero, in the x and y axis. Lines 111a and 110b represent the lines of focus for the respective eyes and connect the center of their respective eye with the point of focus for that eye. These lines come to point 110 representing the location of the coinciding images. In the viewing geometry of FIG. 1, the image for the left eye and the image for the right eye are said to have zero-degrees of parallax.

Figures 2, 3:
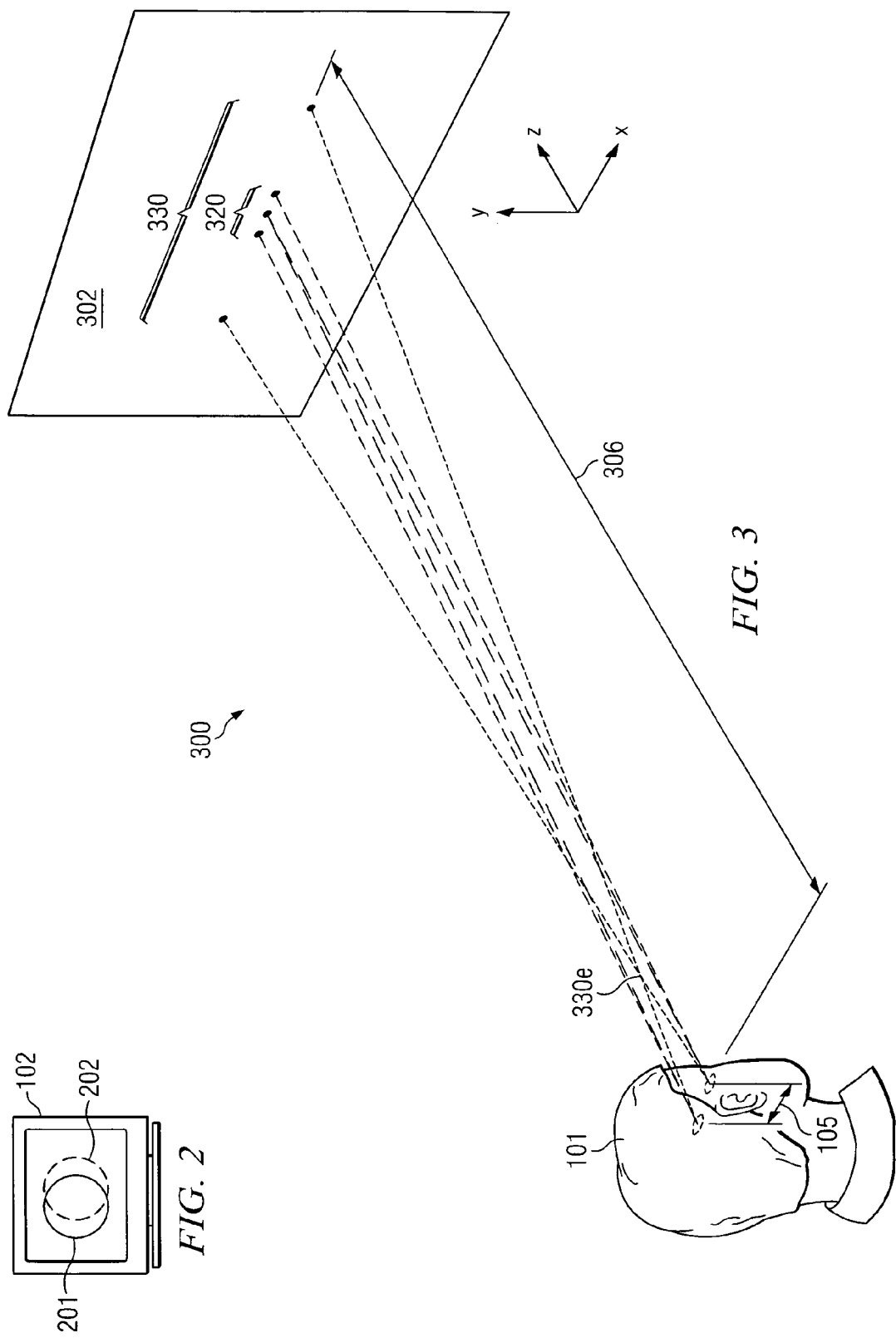
FIG. 2 illustrates a display of an image in one embodiment of the present invention.
FIG. 3 illustrates the geometries utilized in one embodiment of the present invention.

An object that is intended to be perceived by viewer 101 to be in front of or behind the x-y plane, are shown to viewer 101 using images such as those illustrated in FIG. 2. Left image 201 is slightly displaced from right image 202. If the right eye is shown right image 201, and the left eye is shown left image 201, the object will appear to be behind monitor 102. If the right eye is shown left image 201, and the left eye is shown right image 202, the object will appear to be in front of monitor 102. Returning to FIG. 1, we see the lines of focus for these different perceived depths. Objects intended to be perceived as behind monitor 101 are given images with a positive parallax, the most extreme case of this being an object at infinity. Focus line 120a connects the center of left eye 103 to focus point 120b, and focus line 120c connects right eye 104 to focus point 120d. Focus lines 120a and 126b are parallel, and viewer 101 will perceive the object at infinity behind monitor 102. An object intended to be perceived at point 130e in front of screen 102 will have a negative parallax. Focus line 130a connects the center of left eye 103, point 130e, and focus point 130b. Focus line 130c connects the center of right 104, point 130e, and focus point 130d.

In each case, the images will remain at approximately the same distance from the eye to the screen, so there is no change in focus. The binocular cues are fed to viewer 101 through the differences (disparity) between the images seen by eyes 103 and 104, and the amount and sign (whether or not the images are flipped) of their parallax. As noted above, however, the lack of accommodation (focus) will cause stereoscopic fusion to break down if the amount of vergence (size of parallax) is too large. In typical applications a total parallax of plus or minus 1.5 degrees relative to zero (lines 110a and 110b, respectively) is comfortable for most viewers and will not cause a breakdown of stereoscopic fusion. For fast moving objects coming out of the screen, this relationship can be pushed further, sometimes putting the object to within 20 cm of the viewer.

Embodiments of the present invention disassemble the nature of the stereoscopic phenomenon more completely than typical methods, and take advantage of more complete descriptions of how stereoscopic information is perceived. Typically, stereoscopic content is produced using two cameras arranged in parallel, convergently (facing slightly inward), or divergently (pointing slightly outward). Parallel cameras will image distant objects at the same disparity as the distance between the lenses of the cameras, and are useful for approximating the real world geometry of looking at the horizon. Convergent cameras image distant objects with negative parallax (left and right images of an object swapped). Divergent cameras image distant objects further apart than the distance between the lenses. The different camera settings are a creative choice made by the producer of the content, and it may change from scene to scene, or dynamically within a scene. Each provides a means of enhancing the stereoscopic effect of a region (foreground, screen, or distance) thus emphasizing an area of interest to the content producer.

Typically, the image intended for the left eye and the image intended for the right eye cover the same field of view. However, in more extreme applications it is possible to have only a partial overlap between the left and right eyes. Differing fields of view can cause some objects to be seen in only one eye. Often, this is representative of the real world, for example, in large fields of view the left eye may see peripheral objects that the right eye can not. When approximating the real world with stereoscopic methods, the differing fields of view can enhance the overall experience—for example, monoscopic depth cues in the peripheral objects can contribute to the overall depth perception. However, when the edge of the field of view (for example, the edge of the movie theater screen) is not as wide as normal perception, objects which overlap the edge may appear to be behind the screen (this is known as the "window effect"; if you can only see part of an object—then it must be outside the window). If this object was intended to be in-front of the screen, however, then the differing cues will cause the stereoscopic fusion to break down.

A key aspect of the stereoscopic effect is the separation of images intended for the left eye and the right eye that causes the imaged object to appear to come out of the screen (or into the screen) a percentage of the distance the viewer is from the screen. If the viewer is not at the same distance as the focal length of the cameras, however, the effect for that user will be different than that intended by the content producer. This can lead to the breakdown of stereoscopic fusion. The magnitude of the differences and their effect on fusion breakdown can be appreciated by comparing the differing geometries of FIG. 1, where the size of the viewed images is likely smaller than the original content, and the geometries of FIG. 3 where the size of the viewed images is likely larger than the original content.

In FIG. 1, the interpupilar distance (IPD) 105 of viewer 101 is 6 cm, and the viewer is viewing distance 106 (60 cm) from monitor 102 (which is 60 cm wide). FIG. 3 illustrates the geometry of viewing stereoscopic images in a movie theater. In FIG. 3, viewer 101 has an IPD of 6 cm, but a viewing distance 306 (800 cm) from movie screen 302, which is 600 cm wide.

Table 1 details typical parallax values for the geometries of FIG. 1 and FIG. 3 in a percentage of screen size.

| Object Distance | Total Parallax (as % of screen width) | |
| --- | --- | --- |
| | Monitor 60 cm screen at 60 cm | Movie Screen 614 cm screen at 800 cm |
| A At screen | 0.00% | 0.00% |
| B At infinity | 10.00% | 1.00% |
| C 1 degree divergence | 11.67% | 3.33% |
| D 1.5 degrees in-screen | 2.6% | Diverge at 3.40% |
| E 1.5 degrees in-audience | −2.6% | −3.4% |
| F 20 cm from face | −20.00% | −38.0% |
| G 50 %in-audience | −10.00% | −1.00% |

From Table 1, if the object is intended to be at screen depth, then in both FIG. 1 and FIG. 3, by definition, the parallax is zero. However, if the object is at infinity (eyes are focused straight ahead), then for the monitor of FIG. 1, the images are 6 cm apart, 10% of the monitor's width, whereas the same 6 cm is only 1% of the movie screen. Thus, if typical content created for monitor 102 (with 10% parallax) were to be shown on screen 302 (where 10% is much wider than the interpupilary distance), the eyes of viewer 101 would be forced to diverge significantly in order to fuse the images, almost certainly resulting in breakdown in stereoscopic fusion.

Content is typically only generated once. To maximize stereoscopic effect, assumptions are made during content generation based on the intended viewing environment. If a movie theater is intended, then objects at infinity would be filmed (as an example, embodiments of the present invention are not limited to any particular manner of content creation) with a disparity of 6 cm /600 cm or 1% of the screen width. If this content is shown on monitor 102 of FIG. 1, the object at infinity will still have a disparity of left and right images that is 1% of the screen width. But on monitor 102, this is 60 cm×0.01=0.6 cm. 0.6 cm separation in left and right images, will produce almost no stereoscopic effect, and the intent of the content creator has been lost. In the other direction, if the content had been created assuming viewing on monitor 102, an object at infinity would have 6 cm, or 10%, separation in the left and right images. If this content were shown instead on screen 302, there would be 600 cm×0.10=60 cm separation, causing our eyes to be widely divergent and leading to fusion breakdown.

Some applications attempt to use up to 1 degree of divergence (i.e., the eyes actually point away from each other), placing an object "beyond infinity". Such content on monitor 102 would allow up to 12% of the monitor's width, but amount to only 3.3% of movie screen 302. Conventional wisdom calls for generating content to show on a wide variety of screens, by remaining within + or −1.5 degrees of vergence. Such a limited window often precludes attempting stereoscopic effects. Furthermore, the "safe" numbers still do not guarantee protection from fusion breakdown. If I assume viewing to be in the geometry of monitor 102, for example, I can use the IPD to generate a maximum "behind the screen" effect, and use 20 cm from the viewer as the maximum for out of screen. In the geometry of FIG. 1, 20 cm gives a negative parallax that is 20% of monitor 102 (60 cm*0.2=12 cm parallax, where the left image is to the right and the right image to the left). If a content creator respects the FIG. 1 geometry, a significant amount of the "out of the screen" stereoscopic effect must be sacrificed in the geometry of FIG. 2, where it is acceptable to go all the way to 38% parallax to reach the 20 cm limit. If a content creator instead respects the geometry of FIG. 3, a significant amount of the "into the screen" stereoscopic effect must be sacrificed in the geometry of FIG. 1. Trying to design content for both limits the available stereoscopic effects so severely, that is often not worth creating them.

These issues occur, in large part, because the IPD is a static constant, while the viewing geometry can change drastically. This is a key source of frustration for content producers, because they must limit themselves to stereoscopic effects that are viewable on all likely viewing environments. The more varying the likely environment, the more limited the possible stereoscopic effects, if the content will be viewable in all. Further complications arise when varying viewing angles are accounted for. All of the examples used here have assumed a viewing angle of near 90 degrees. In the real world, viewing an object from an acute angle changes the relative angles between all objects that are at different depths. When viewing a screen, however, the parallax is static, regardless of the viewing angle. Thus content producers must further limit the stereoscopic effects to only those viewable from all likely viewing angles. Often, the likely viewing environments are of such varying geometries that no stereoscopic effects are possible.

To be safe a content creator targeting both movie and DVD release (for example), would have to choose very safe settings for both into the screen and out of the screen maximums. On the other hand, creating for a preferred venue, may make some effects untenable for the other geometry. For example, bringing a fast moving object out of the screen with a 38% parallax will work within a movie, but will move the object very close to a viewer at a monitor causing them to go cross-eyed. Embodiments of the present invention recognize that the difference between the content geometry and the viewing geometry can make the stereoscopic effect a liability. If the difference is to extreme, the only solution may be to simply turn off the stereoscopic effects. Alternatively, embodiments of the present invention may alter the viewing geometry in order to meet the requirements of the content geometry (this could, for example, be done in a head mounted display (HMD) by changing the viewing optics). In order to successfully adapt to the difference between geometries, embodiments of the present invention combine the geometry used to create the content with the data defining the content.

To do this, embodiments of the present invention further divide content into two generalized categories: rendered and native. Rendered content is content that has been projected onto an x-y plane. Typical examples of this would be television programming, movies or Motion Pictures Expert Group—version II encoding scheme—(MPEG-II) the scheme used on many DVDs. In rendered content, the depth (or z-axis) information exists in the disparity and parallax of the left and right eye images. Native content, in contrast, is content with full three-dimensional information available. Examples of this would be certain MPEG-IV content (which can contain three dimensional descriptions), or computer representations of virtual environments, such as games.

For rendered content, embodiments of the present invention include with the data describing the images, the intended geometry of the content creator. This information can be captured at the time of rendering, or determined by inspection, software, or other means after it has been rendered. This can occur when the content was captured (for example, using camera technology) or when the projection is created (for example, during rendering of a 3D model). For content generated using traditional camera technology, for example, the content geometry may include: distance between left and right camera lenses, convergence (or divergence) angle of the camera lenses, focal length of both cameras, field of view of both lenses, overlap of field of views. The captured content will independently contain an aspect ratio and a resolution. The same information can be stored for computer rendered content using virtual cameras.

Such embodiments can be very useful when viewing geometries, expected to be similar, turn out to differ dramatically. IMAX screens, for example, can range from under 50 feet diagonals to well over 125 feet. Thus, creating a single version of a stereographic film for all IMAX theaters is not ideal. Using embodiments of the present invention, the known viewing geometry can be used to generate more appropriate content for each theater, by, for example, changing the projection geometry to change the effective disparity on the screen by causing the projectors to converge, for example.

In addition, it is often desirable to change the content geometry of movie (or other content) from scene to scene, or even dynamically within a scene. Having a small window of available effects, often makes this unmanageable, but embodiments of the present invention recognize the link between content geometry and viewing geometry, and use knowledge of both to more effectively manage the handling of this dynamic stereoscopic content. The information needed to make these determinations can be captured as described above, and included with the image data of each scene, or even with each frame. Making it possible to dynamically manage the stereoscopic effects.

There are many ways to store geometry in rendered data. Embodiments of the present invention are not limited to any particular method, but; rather, may use any method that successfully incorporates the content geometry with the content data. For example, in traditional camera technology, each of inter-camera distance, focal length of left camera, focal length of right camera, field of view, angle between the cameras (parallel, converging, diverging), field of view overlap, or other geometric descriptions of the capture environment can be represented using numbers that can be incorporated into digital image data and adapted to fit into any one of a number of different methods and formats currently available and known to those of ordinary skill in the art. If the amount of data is to be minimized, a smaller description, such as the ratio of the focal length to the field of view, may be enough information to store. Regardless, each number may be tagged with the attribute it is describing, for example, ("Left focal length", 300 cm). Further, standards can be established such that the order of the attributes and/or the unit of measurement may be fixed, in which case the tag and descriptors may not be required. Thus, some embodiments may store any of these formats as a simple series of numbers.

In some embodiments, many aspects of the present invention involves simply storing a set of numbers inside a content stream in a well understood and retrievable manner. Some examples of this would be:

1. Using standard encoding techniques within the blanking interval for TV signals (where close captioning is stored, for example).
2. Within side-band information for uncompressed video—within a header or trailer, for example. This header or trailer could be for the entire film, or it could be a header or trailer for each scene, or each video frame.
3. Within header information for compressed video—for example, within the user data sections of the MPEG headers.
4. Within watermarks—that is, within the content of the video itself. This can be done in such a way that it survives compression/decompression cycles as well as digital to analog to digital conversions The embodiments of the present invention are not limited to these methods, but, rather may use any method or functionality that suitably encodes the information necessary to analyze a difference between content and viewing geometries.

In an example embodiment adapted to use traditional camera technology, three numbers (the inter-camera distance, the focal length, and the angle between the cameras) are stored in every frame of video. This allows the basic geometry to be easily read and changed while the content is being shown. It also allows the geometry to be retrieved at any point in the video (should the user start the movie in the middle, for example), without needing to read information before the video stream. According to the embodiment, three numbers are stored as single bytes within a simple watermark. Further, the watermark has been positioned within a predetermined area of the video so that retrieving the data is not time-consuming. In this case, the three bytes are represented as low frequency variations in the blue channel of the last eight lines of video—this allows the data to survive MPEG and other encoding schemes. However, this invention is not limited to how the data is stored.

All of the above encoding descriptions and examples may be utilized for native content as well. Native content, however, can provide a significant increase in system flexibility because the extent of the defined world-view will already be embedded in the content. Systems capable of handling native content typically render the content themselves, and thus can have the ability to alter the content geometry. In this case, embodiments of the present invention can render the stereoscopic images to conform to the viewing geometry. Alternative embodiments may place creative control over the stereoscopic effect within the native content itself That is, the equivalent of virtual camera positions may be documented within the content, and these can serve as a reference for conversion to the viewing geometry. Native content rendered to the viewing geometry can take particular advantage of many aspects of the present invention as the creative intent of the content can be reproduced across multiple viewing scenarios, from PC's to TV's to home theaters to movie theaters to large screen formats. In alternative embodiments, a user can influence the content geometry (chose point of view, for example) to affect personalized choices for the amount of stereographic effect.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of preserving at least one image, said method comprising:
   storing said image in a computer readable medium wherein said image is a series of image frames comprising video data;
   determining a content generation geometry for said image;
   encoding said content geometry and storing it with said image;
   periodically re-determining said content geometry; and
   only storing said content geometry when said content geometry changes.

2. The method of claim 1 further comprising:
   manually capturing said content geometry from a configuration of a system generating said image.

3. The method of claim 1 further comprising:
   automatically capturing said content geometry as said image is generated.

4. The method of claim 1 wherein said content geometry applies to all said image frames, and wherein said content geometry is stored on only one said frame.

5. The method of claim 1 wherein each said frame has a unique content geometry, and wherein each said frame's content geometry is stored with its respective frame.

6. The method of claim 1 wherein said content geometry is stored as a watermark.

7. The method of claim 1 wherein said content geometry comprises at least one of screen dimensions, aspect ratio, viewing distance, resolution, left and right field of view size, left and right field of view overlap, camera convergence, or camera divergence.

8. A method of claim 1 wherein said image data is data containing three-dimensional image information.

9. The method of claim 8 wherein said data comprises at least one virtual viewing perspective, and said content geometry is associated with said at least one prospective.

* * * * *

UNITED STATES PATENT AND TRADEMARK OFFICE
CERTIFICATE OF CORRECTION

| | | |
|---|---|---|
| PATENT NO. | : 7,660,472 B2 | Page 1 of 1 |
| APPLICATION NO. | : 11/049361 | |
| DATED | : February 9, 2010 | |
| INVENTOR(S) | : Todd Simpson | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 817 days.

Signed and Sealed this

Thirtieth Day of November, 2010

David J. Kappos
*Director of the United States Patent and Trademark Office*